(No Model.) 3 Sheets—Sheet 2.
A. M. VEREKER & S. M. YEATES.
CAR BRAKE AND STARTER.
No. 373,624. Patented Nov. 22, 1887.
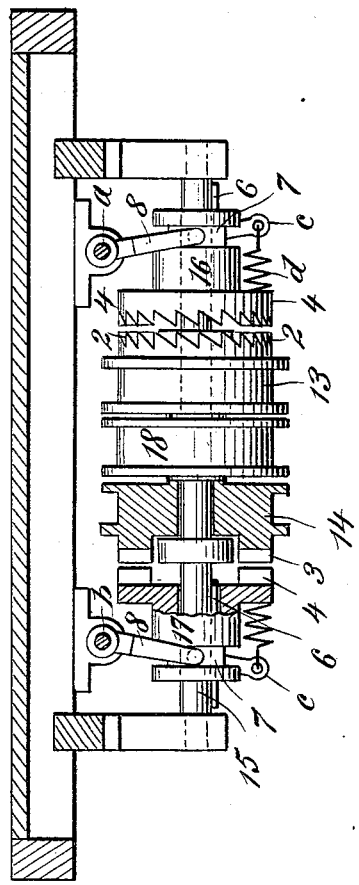
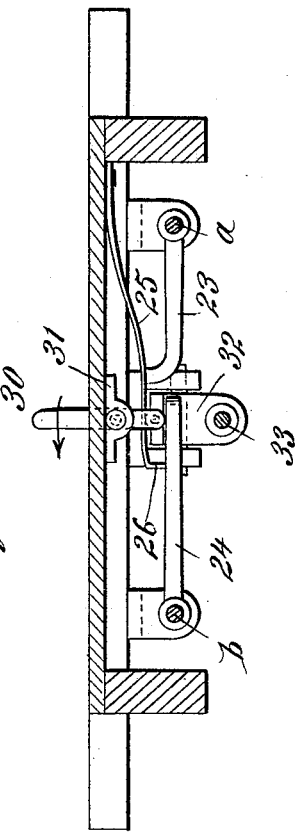
WITNESSES:
Dom Twitchell
C. Sedgwick
INVENTOR:
A. M. Vereker
S. M. Yeates
BY Munn & Co
ATTORNEYS.

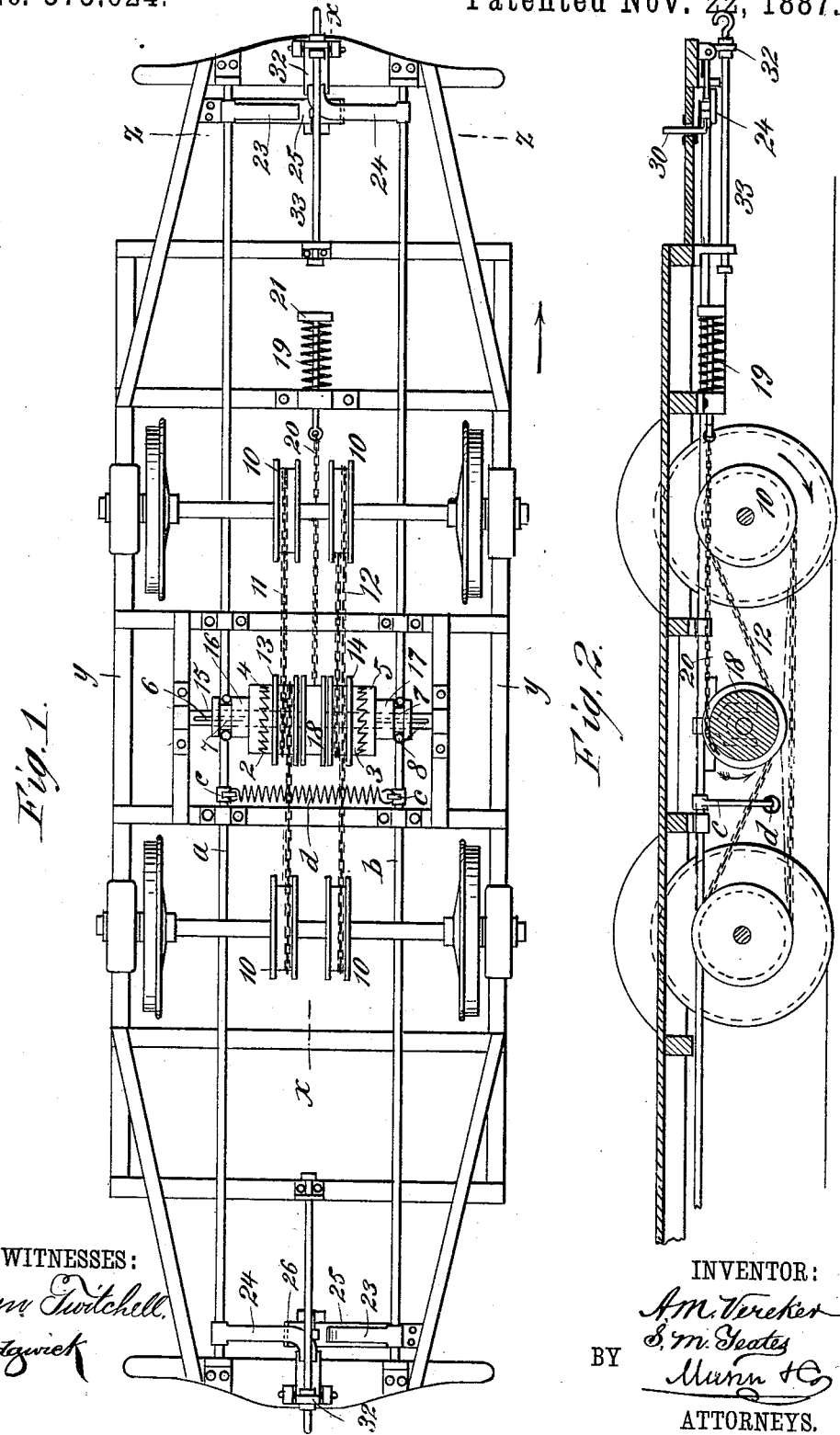

(No Model.) 3 Sheets—Sheet 3.
A. M. VEREKER & S. M. YEATES.
CAR BRAKE AND STARTER.
No. 373,624. Patented Nov. 22, 1887.
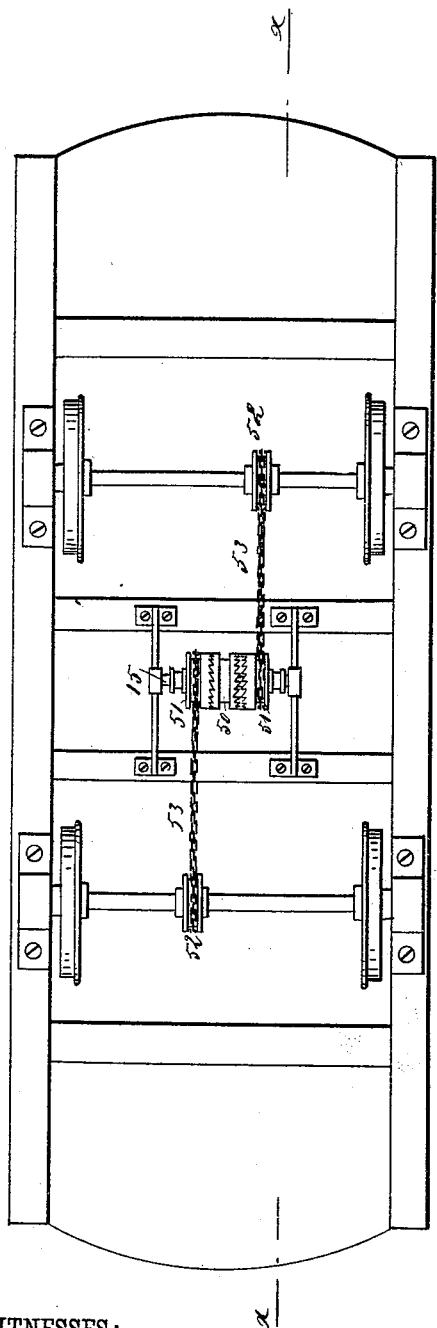
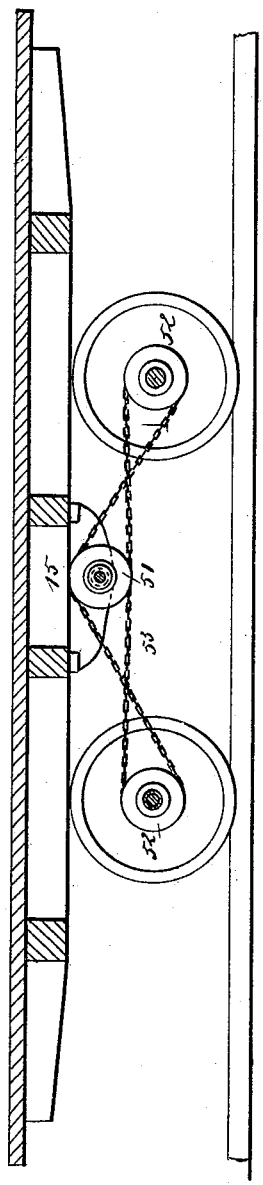
WITNESSES:
C. Neveux
E. Sedgwick
INVENTOR:
A. M. Vereker
S. M. Yeates
BY Munn & Co
ATTORNEYS.

United States Patent Office.

AMOS M. VEREKER AND STEPHEN M. YEATES, OF DUBLIN, IRELAND.

CAR BRAKE AND STARTER.

SPECIFICATION forming part of Letters Patent No. 373,624, dated November 22, 1887.

Application filed May 17, 1887. Serial No. 238,473. (No model.)

*To all whom it may concern:*

Be it known that we, AMOS MORONY VEREKER and STEPHEN MITCHELL YEATES, of Dublin, Ireland, Great Britain, have invented a new and Improved Automatic Brake and Car-Starter, of which the following is a full, clear, and exact description.

This invention relates to an improvement upon the car brake and starter illustrated, described, and claimed in our application, No. 224,761, filed on the 19th day of January, A. D. 1887; and the invention consists of an automatic arrangement which, acting as a brake to stop the car, stores up the force, so that it will be available for starting the car again when required. This we accomplish by fixing on either or both axles of the car (preferably both) a small drum or pulley, and fixing between the car-axles, or in other suitable position, a short supplemental shaft or axle carrying two loose drums and one fixed drum. The fixed drum is governed by a strong spring, and the loose drums are fitted with ratchets or friction-clutches which act in opposite directions upon said loose drums. Endless bands or chains are passed around the fixed drums on the car-axles and around the loose drums on the supplemental axle, the bands or chains passing in opposite directions around said loose drums, and in such a manner that no matter which way the car is running the spring attached to the fixed drum will be wound up ready for action by throwing one of the ratchets or clutch-sections into engagement with its loose drum.

By a suitable arrangement of levers the driver can throw either or both of the ratchets or friction-clutches into action at will, and by putting both into action when the car is running, the one opposed to the motion of the car engages with its loose drum, and thereby acts to wind up the spring that is connected to the fixed drum of the supplemental shaft, the spring being held in the wound position by the second ratchet until released by the driver or by the horses, as will be hereinafter more fully described, and specifically pointed out in the claims.

Reference is to be had to the accompanying drawings, forming a part of this specification, in which similar figures and letters of reference indicate corresponding parts in all the views.

Figure 1 is an inverted plan view of the frame-work of a car, representing the same as provided with our improved form of automatic braking and starting mechanism. Fig. 2 is a longitudinal sectional view taken on line $x\ x$ of Fig. 1. Fig. 3 is a cross-sectional view upon an enlarged scale, the view being taken on line $y\ y$ of Fig. 1, parts being broken away. Fig. 4 is a cross-sectional view taken on line $z\ z$ of Fig. 1. Fig. 5 is an inverted plan view of a modified construction, and Fig. 6 is a longitudinal sectional view taken on line $x\ x$ of Fig. 5.

In constructing such an apparatus as the one forming the subject-matter of this application, we rigidly connect two drums 10 to each of the car-axles, and upon these drums we mount chains 11 and 12, which pass about drums 13 and 14, that are loosely mounted upon a short transverse supplemental shaft, 15, that is mounted in proper bearings beneath the flooring of the car, and preferably between the two car-axles, the chain 11 passing from the drum 10 to the under side of the drum 13, to be carried about said drum, while the chain 12 passes from the drum 10 to the upper side of the drum 14, to be carried about said drum, the return length of the chain 12 passing beneath its drum 14, while the return length of the chain 11 passes above its drum 13.

The drums 13 and 14 are formed, respectively, with clutch-sections 2 and 3, that are inversely formed, and these clutch-sections are arranged so that they may be engaged by other clutch-sections 4 and 5, that are formed upon sleeves 16 and 17, which sleeves are mounted upon feathers 6, that are formed upon or connected to the shaft 15. Between the drums 13 and 14, or at any other convenient point upon the shaft 15, we mount a fixed drum, 18, which is connected with a spring, 19, by means of a chain, 20, and a follower, 21.

The sleeves 16 and 17 are formed with annular grooves 7, that are engaged by bifurcated arms 8, which extend downward from horizontal rods $a$ and $b$, said rods being provided with other arms $c$, that are connected by a spring, $d$, the tendency of which is to throw the clutch-sections of the drums and sleeves into engagement.

The rods $a$ and $b$ each carry levers 23 and 24, said levers being inversely arranged upon their rods, the lever 23 of one rod being opposite the lever 24 of the other rod; and each pair of levers 23 and 24 are normally held in the position in which they are shown in Fig. 4 by a spring, 25, which bears upon the upper side of each lever, the end of the spring being bent downward, as shown at 26, in order that it may reach the lever 24. The springs 25 are of sufficient strength to overbalance the spring d, and consequently to hold the clutch-sections of the drums and sleeves out of engagement.

An operating-lever, 30, is pivotally mounted in a bracket, 31, that is secured beneath the platform, and the long arm of this lever extends upward through an aperture formed in the platform-floor, while the short arm of the lever extends downward and carries an anti-friction roller that is arranged to bear against the under side of the spring 25, so that as the lever 30 is thrown in the direction of the arrow (shown in connection therewith in Fig. 4) the spring 25 will be raised and the levers 23 and 24 will be moved toward the platform of the car by the spring d, the clutch-sections being at this time thrown into engagement.

The draw-bar of the car, which is shown at 33, passes through the short arm of a bell-crank lever, 32, and is adjustably held to said lever by jam-nuts, said bell-crank lever being mounted beneath the platform in a position so that its long arm will bear upon the upper face of the lever 24, from which construction it will be seen that when the car is started forward the lever 24 will be depressed.

Such being the general construction of the brake and starting mechanism, the operation is as follows: We will suppose that the car is moving in the direction of the arrow shown in connection therewith in Fig. 1, in which case the car-wheels will move in the direction of the arrow shown in connection therewith in Fig. 2, and when the car is moving it will be understood that the springs 25 will act to hold the clutch-sections of the supplemental shaft out of engagement. If at this time the driver desires to stop the car, he will move the lever 30 in the direction of the arrow shown in connection therewith in Fig. 4, thereby raising the spring 25 and permitting the spring d to rock the rods a and b to throw the clutch-sections 2 and 4 and 3 and 5 into engagement. Then as the car advances the clutch-sections 3 and 5 will act to move the drum 18 in the direction of its arrow, thus drawing the chain 20 against the tension of the spring 19, and tending to check the momentum of the car, the clutch-sections 2 and 4 at this time slipping the one past the other, the section 4, which turns with the shaft, sliding outward from the section 2, and of course slightly rocking the rod a; but when it is desired to start the car forward the pull upon the draw-bar will tilt the lever 24, so as to throw the clutch-sections 3 and 5 from engagement, thus permitting the spring 19 to turn the shaft 15 in a direction contrary to that of the arrow shown in connection with the drum, and to thereby start the car-wheels forward.

It will of course be understood that the same effect will be produced should the car be moving in an opposite direction to that described; but in such case it would be the clutch-sections 2 and 4 which would act against the tension of the spring 19, while the clutch-sections 3 and 5 would be held in engagement, at the time the clutch-sections 2 and 4 were thrown out of engagement, by the pull upon the draw-bar.

In Figs. 5 and 6 we illustrate a construction wherein there is shown a single fixed drum, 50, formed with two sets of clutch-teeth that are engaged by other clutch-teeth formed on loose drums 51, that are mounted on the shaft 15, the drum 50 being connected to the spring 19, while the loose drums are connected by crossed chains 53 to drums 52, carried by the car-axles.

Having thus fully described our invention, we claim as new and desire to secure by Letters Patent—

1. In a car brake and starter, the combination, with a car-axle and drums mounted thereon, of a supplemental shaft, a fixed drum on the supplemental shaft, a spring connected to said drum, loose drums on the said shaft, chains connecting the drums of the axle and supplemental shaft, clutches acting in opposite directions upon the loose drums, and means for operating the said clutches, substantially as herein shown and described.

2. In a car brake and starter, the combination, with the car-axles, drums mounted thereon, a supplemental shaft between the axles, a fixed drum on the supplemental shaft, a spring connected to said drum, loose drums on the said shaft, chains connecting the said drums, and clutches acting in opposite directions upon the loose drums of the supplemental shaft, of horizontal rods engaging the clutches, a spring connecting the said rods and holding the clutches into engagement, and means for throwing and holding the clutches out of engagement, substantially as herein shown and described.

3. In a car brake and starter, the combination, with the car-axles, drums thereon, a supplemental shaft between the axles, a fixed drum on the said shaft, a spring connected to the drum, loose drums on the supplemental shaft, chains connecting the said drums, and clutches acting in opposite directions upon the loose drums, of horizontal rods engaging the clutches and provided with arms connected by a spring and with levers at its ends, a spring engaging the said levers, and means for disengaging the spring from the said levers, substantially as herein shown and described.

A. M. VEREKER.
Witnesses:    S. M. YEATES.
 C. LINNE,
 J. L. McCUSKILL.